US007828926B1

(12) United States Patent
Gaysinskiy

(10) Patent No.: US 7,828,926 B1
(45) Date of Patent: Nov. 9, 2010

(54) SELECTIVE REMOVAL OF RESIN COATINGS AND RELATED METHODS

(75) Inventor: Valeriy Gaysinskiy, Allston, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 1144 days.

(21) Appl. No.: 11/397,783

(22) Filed: Apr. 4, 2006

(51) Int. Cl.
*B29C 63/00* (2006.01)

(52) U.S. Cl. ....................... 156/344; 156/241; 156/584; 225/3; 225/5; 225/7; 225/21; 225/24; 225/28; 225/31; 225/42; 225/91; 225/94; 225/96; 225/96.5; 30/136; 29/244; 29/426.1; 29/426.4; 29/426.5; 29/762; 250/370.11; 15/104.002; 83/111; 428/40.1

(58) Field of Classification Search ................. 156/344, 156/584, 241; 30/136; 29/244, 426.1, 426.4, 29/426.5, 762; 250/370.11; 15/104.002; 83/111; 225/3, 5, 7, 21, 24, 42, 91, 94, 96, 225/96.5, 28, 31; 428/40.1
See application file for complete search history.

(56) References Cited

U.S. PATENT DOCUMENTS

| | | | | | |
|---|---|---|---|---|---|
| 859,000 | A | * | 7/1907 | Marsh | 225/91 |
| 3,179,317 | A | * | 4/1965 | Voelker | 225/4 |
| 3,818,592 | A | * | 6/1974 | Himeno | 30/151 |
| 4,059,467 | A | * | 11/1977 | Mancke et al. | 156/344 |
| 4,631,103 | A | * | 12/1986 | Ametani | 156/241 |
| 5,171,996 | A | | 12/1992 | Perez-Mendez | |
| 6,262,422 | B1 | * | 7/2001 | Homme et al. | 250/370.11 |
| 6,278,118 | B1 | * | 8/2001 | Homme et al. | 250/370.11 |
| 6,469,305 | B2 | | 10/2002 | Takabayashi | |
| 6,503,130 | B2 | * | 1/2003 | Lim | 451/285 |
| 6,921,909 | B2 | | 7/2005 | Nagarkar et al. | |
| 2005/0205204 | A1 | * | 9/2005 | Kurosawa et al. | 156/344 |

OTHER PUBLICATIONS

Nagarkar et al., "CCD-Based High Resolution Digital Radiography System for Non Destructive Evaluation," *IEEE Trans. Nucl. Sci.* 44:885-889 (1997).
Nagarkar et al., "Structured CsI(T1) Scintillators for X-Ray Imaging Applications," *IEEE Trans. Nucl. Sci.* 45:492-496 (1998).
Nagarkar et al., "New Design of a Structured CsI (T1) Screen for Digital Mammography," *SPIE, Physics of Medical Imaging* 5030:541-546 (2003).
Shestakova et al., "A New Sensor for Thermal Neutro Imaging," *IEEE Trans. Nucl. Sci.* 52:1109-1113 (2005).

* cited by examiner

*Primary Examiner*—Kat Wyrozebski
*Assistant Examiner*—Joshel Rivera
(74) *Attorney, Agent, or Firm*—Townsend and Townsend and Crew LLP

(57) ABSTRACT

The present invention provides assemblies and methods for selectively removing resin coatings from a radiation detector. A method includes positioning a cutting edge on a resin coating formed on a radiation detector. The method further includes positioning a bonding member on the resin coating, applying a force to the bonding member such that a portion of the resin coating is pulled away from the radiation detector, and cutting the resin coating so as to detach the portion of the resin coating pulled away from the detector, thereby selectively removing the portion of the resin coating from the radiation detector.

20 Claims, 8 Drawing Sheets

SELECTIVE REMOVAL OF RESIN COATINGS AND RELATED METHODS

BACKGROUND OF THE INVENTION

The present invention relates generally to radiation detectors and methods. More specifically, the present invention relates to methods and assemblies for selectively removing a portion of a resin coating from a scintillation detector.

Scintillation spectrometers are widely used in detection and spectroscopy of energetic photons (e.g., X-rays and γ-rays). Such detectors are commonly used, for example, in nuclear and particle physics research, medical imaging, diffraction, non destructive testing, nuclear treaty verification and safeguards, nuclear non-proliferation monitoring, and geological exploration.

A wide variety of scintillators are now available and new scintillator compositions are being developed. Among currently available scintillators, thallium-doped alkali halide scintillators have proven useful and practical in a variety of applications. One example includes thallium doped cesium iodide (CsI(Tl)), which is a highly desired material for a wide variety of medical and industrial applications due to its excellent detection properties, low cost, and easy availability. Having a high conversion efficiency, a rapid initial decay, an emission in the visible range, and cubic structure that allows fabrication into micro-columnar films (see, e.g., U.S. Pat. No. 5,171,996), CsI(Tl) has found use in radiological imaging applications. Furthermore, its high density, high atomic number, and transparency to its own light make CsI(Tl) a material of choice for x-ray and gamma ray spectroscopy, homeland security applications, and nuclear medicine applications such as intra-operative surgical probes and Single Photon Emission Computed Tomography or SPECT.

Scintillation spectrometry generally comprises a multi-step scheme. Specifically, scintillators work by converting energetic photons such as X-rays, gamma-rays, and the like, into a more easily detectable signal (e.g., visible light). Thus, incident energetic photons are stopped by the scintillator material of the device and, as a result, the scintillator produces light photons mostly in the visible light range that can be detected, e.g., by a suitably placed photodetector. Various possible scintillator detector configurations are known. In general, scintillator based detectors typically include a scintillator material optically coupled to a photodetector. In many instances, scintillator material is incorporated into a radiation detection device by first depositing the scintillator material on a suitable substrate. A suitable substrate can include a photodetector or a portion thereof, or a separate scintillator panel is fabricated by depositing scintillator on a passive substrate, which is then incorporated into a detection device.

In addition to scintillator material, additional coatings, such as those including organic resins and polymers, are often deposited on scintillator detectors for various reasons. Some resin coatings, for example, have properties such that the resin coating acts as a protective coating with respect to nearby or adjacent layers (e.g., substrate, scintillator, etc.). Typically, when a resin coating is deposited on a scintillator detector assembly, the resin will coat many, if not all, of the exposed surface of the assembly, including portions of the assembly where coating may not necessarily be desired. As such, selective removal of portions of the coating is often required.

Unfortunately, resin coating can often coat sensitive, delicate, and/or expensive components of the scintillator detector assembly. While the coating itself may not damage the detector assembly components, significant damage is often sustained in the process of removing the coating from the components. For example, certain commonly used resin films adhere strongly to the detector, are resilient, and not easily removed in a controlled manner. To avoid damage to the detector or inaccurate removal of the wrong portions of resin films caused by simply tearing the resin films from the detector, current practice typically includes careful cutting and removal of the film. However, since the coating is often present on very sensitive components including, for example, the detectors electrical components, errors common in the cutting and removal process often result in damaged detector components, thereby decreasing yields in detector manufacturing and assembly, and greatly increasing costs.

Thus, there is a need for improved techniques and methods, as well as tools and assemblies, for removing portions of resin coatings deposited on scintillation detectors. In particular, methods and assemblies are needed for selectively removing portions of resin coatings from detectors in a controlled and accurate manner, and by avoiding the damage often inflicted by current removal methods.

BRIEF SUMMARY OF THE INVENTION

The present invention provides methods and assemblies for selectively removing a portion of a resin coating from a scintillation detector. The assemblies and related methods include positioning a portion of the assembly on a resin coating and utilizing a bonding member or frame to apply a force that lifts or pulls a portion of the resin coating away from the detector, while applying a cutting member or frame to hold the desired portion in place on the detector. The combination of the properly positioned cutting member and the application of the bonding member allows careful and controlled removal of the portion of the resin coating which is targeted, while leaving the desired resin coating on the detector and avoiding unnecessary damage to the detector or components thereof.

Thus, in one aspect of the present invention, a method of selectively removing a portion of a resin coating from a radiation detector is provided. The method includes positioning resin cutting edge on a resin coating formed on a radiation detector. The method further includes positioning a bonding member on the resin coating, applying a force to the bonding member such that a portion of the resin coating is pulled away from the radiation detector, and cutting the resin coating so as to detach the portion of the resin coating pulled away from the detector, thereby selectively removing the portion of the resin coating from the radiation detector.

In another aspect, the present invention provides a method of removing a portion of a resin coating formed on a radiation detector including positioning on the resin coating a first substantially rigid frame having a resin cutting edge so as to define a first portion of the resin coating. The method further includes positioning on the resin coating a second substantially rigid frame having a resin bonding surface. The second frame is positioned such that the cutting edge of the first frame is fit substantially within a periphery of the second frame and the resin bonding surface contacts a second portion of the resin coating. The method additionally includes applying a force to the second frame such that the second portion of the resin coating is pulled away from the radiation detector, and cutting the resin coating so as to detach the second portion of the resin coating and leave the first portion of the resin coating on the radiation detector.

In another aspect, the present invention provides an assembly for selectively removing a portion of a resin coating from a radiation detector. In one embodiment, the assembly includes a radiation detector comprising a resin coating formed thereon, a cutting member having a distal end comprising a resin cutting edge, the cutting edge positioned on the resin coating, and a bonding member comprising a bonding surface positioned on the resin coating. In another embodiment, the assembly includes a first substantially rigid frame having a resin cutting edge. The cutting edge of the first frame defines an area representing a portion of a resin coating formed on the radiation detector. The assembly further includes a second substantially rigid frame having a resin bonding surface. The second frame is dimensioned such that the first frame fits substantially within the periphery of the second frame.

In one embodiment of the present invention, a resin cutting edge will include an edge having an angle of about 90 degrees. However, the resin cutting edge can include an angle of about 90 degrees or less. In another embodiment, the resin cutting edge has an angle of greater than about 90 degrees. In one embodiment, the cutting of the resin coating includes pulling the resin coating across the resin cutting edge. In some instances, the cutting includes applying a cutting tool to the portion of the resin coating pulled away from the radiation detector.

A resin coating typically includes an organic polymer. An organic polymer resin can include, for example, para-xylylene polymer compositions. Resin coatings can also include films, tapes, and the like and can comprise materials such as polyesters (e.g., Mylar™), polyimides, (e.g., Kapton™), polyvinylidene chlorides (e.g., saran resins or films), and epoxy polymers.

As set forth above, the resin coatings can be formed on a variety of substrates. In one embodiment, the substrate includes compositions such as amorphous carbon, or includes glassy carbon, graphite, aluminum, sapphire, beryllium, or boron nitrate. In another embodiment, the substrate includes a fiber optic plate, prism, lens, scintillator, or photodetector. The substrate can be a detector device or portion or surface thereof (e.g., optical assembly, photodetector, etc.). The substrate can be separate from a detector device and/or comprise a detector portion (e.g., scintillator panel) that can be adapted to or incorporated into a detection device or assembly. In one embodiment, the scintillator is optically, but not physically, coupled to a photodetector.

Scintillators suitable for use in the present invention include any scintillator compositions that receive a resin coating of the invention. Scintillators can include, for example, CsI(Tl), NaI(Tl), CsI(Na), CsI(Eu), CsBr(Eu), CsI(Tl:Eu), ZnS, ZnS(Ag), ZnSe(Te), $LaB_3$(Ce), $LaCl_3$(Ce), $LaF_3$, $LaF_3$ (Ce), ceramic scintillators, and the like. In a particular embodiment, microcolumnar CsI(Tl) is used. In one embodiment, the microcolumnar CsI(Tl) is pixellated, for example, so as to further improve spatial resolution.

For a fuller understanding of the nature and advantages of the present invention, reference should be made to the ensuing detailed description and accompanying drawings. Other aspects, objects and advantages of the invention will be apparent from the drawings and detailed description that follows.

DETAILED DESCRIPTION OF THE INVENTION

Figure 1:
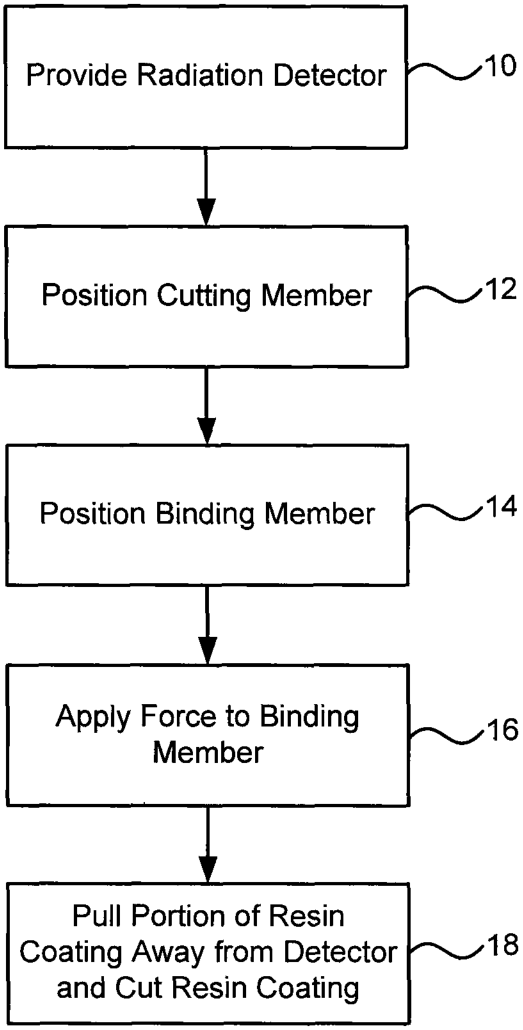
FIG. 1 is a flow chart illustrating a method of selectively removing a portion of a resin coating from a radiation detector according to one embodiment of the present invention.

Referring to FIG. 1, a method of selectively removing a portion of a resin coating from a radiation detector according to an embodiment of the invention is described. As indicated in block 10, a radiation detector is provided. The radiation detector will typically include at least a substrate, a scintillator layer, and a resin coating. Next, a cutting member is positioned on the resin coating formed on the radiation detector, as indicated in block 12. The cutting member includes a distal end having a resin cutting edge. The cutting member is positioned on the resin coating such that the resin cutting edge is at the desired location on the resin coating. The method additionally includes positioning a bonding member on the resin coating, as indicated in block 14. The bonding member is positioned at a location on the resin coating separate from positioning of the cutting member, but typically near or adjacent to the positioned cutting member. The bonding member includes a resin bonding surface that attaches or adheres to the resin coating. Following positioning of the bonding member, a force is applied to the bonding member, as indicated in block 16. The force applied is such that a portion of the resin coating is pulled away from the detector and the resin coating is cut, as indicated in block 18. Typically, the force is applied in a generally upward direction, such as by lifting the bonding member. Once the portion of resin coating is pulled away from the detector, the resin coating is cut so as to detach the portion of the resin coating pulled away from the detector, thereby selectively removing the portion of the resin coating from the radiation detector. In certain embodiments, cutting the resin coating is accomplished by pulling the portion of resin coating away from the detector and across the cutting edge of the cutting member, such that the steps illustrated in block 18 essentially includes a single step or action.

Selective removal of a portion of a resin coating using an assembly according to an embodiment of the invention is described with reference to FIGS. 2A and 2B. A radiation detector 22 typically includes a substrate 24, a resin coating 26, and a scintillation layer 28.

As will be recognized, various substrates are suitable for use in a scintillator radiation detector according to the invention. Non-limiting examples include compositions such as amorphous carbon, or includes glassy carbon, graphite, aluminum, sapphire, beryllium, or boron nitrate. Additional examples can include a fiber optic plate, prism, lens, scintillator, or photodetector. The substrate can be a detector device or portion or surface thereof (e.g., optical assembly, photodetector, etc.). The substrate can be separate from a detector device and/or comprise a detector portion (e.g., scintillator panel) that can be adapted or optically coupled to, or incorporated into a detection device (e.g., photodetector) or assembly.

Various resin materials are known in the art and can be used in forming resin coatings. The resin coating typically includes an organic polymer resin. In a particular embodiment, the resin coating includes a para-xylylene polymer composition. Various para-xylylene polymer compositions are known and include, for example, compositions known by the trade name "parylene" including, for example, poly-para-xylylene (trade name "Parylene N", such as available from Paratronix, Inc, Attleboro, Mass.) and poly-monochoro-para-xylylene (trade name "Parylene C", such as available from Paratronix, Inc, Attleboro, Mass.) Resin coatings can also include films, tapes, and the like and can comprise materials such as polyesters (e.g., Mylar™), polyimides, (e.g., Kapton™), polyvinylidene chlorides (e.g., saran resins or films), and epoxy polymers. Other organic polymer, including those commonly used as conformational coatings, will be suitable for use as resin coatings according to the present invention.

A variety of different scintillators may be used in forming a scintillator layer for a radiation detector of the present invention. Scintillators can include, for example, CsI(Tl), NaI(Tl), CsI(Na), CsI(Eu), CsBr(Eu), CsI(Tl:Eu), ZnS, ZnS (Ag), ZnSe(Te), $LaB_3(Ce)$, $LaCl_3(Ce)$, $LaF_3$, $LaF_3(Ce)$, ceramic scintillators, and the like. In a particular embodiment of the present invention, the radiation detector includes a scintillator layer having a CsI(Tl) scintillator, such as a micro-columnar CsI(Tl) scintillator (Nagarkar et al., *IEEE Trans. Nucl. Sci.* 44:492 (1998); Nagarkar et al., *IEEE Trans. Nucl. Sci.* 44:885 (1997)). Furthermore, a microcolumnar layer may be pixellated, for example, so as to further improve spatial resolution. Thus, in one embodiment, the scintillator layer includes a pixellated micro-columnar film scintillator. A scintillator layer can include, for example, a pixellated micro-columnar CsI(Tl) scintillator. For further discussion of pixellated microcolumnar film scintillators see, for example, Nagarkar et al., *SPIE, Physics of Medical Imaging*, Vol. 4, No. 21, pp 541-546, (2003); and Shestakova et al., *IEEE Trans. Nucl. Sci.*, Vol. 52, No. 4., August (2005). See also, commonly owned U.S. Pat. No. 6,921,909, which is incorporated herein by reference.

Scintillator layer can be deposited directly on the substrate, with a resin coating formed on both the scintillator layer and substrate, as typically illustrated herein. However, various other detector configurations can be included for use in the present invention, and the detectors are not intended to be limited to any particular configuration. For example, scintillator layer can be deposited on the resin coating, such that the resin coating is at least partially disposed between the substrate and the scintillator. In such instances, selective removal can be accomplished after formation of the resin coating on the detector and either before or after deposition of the scintillator layer. For example, selective removal can be accomplished after formation of the scintillator layer, and after deposition of a second resin coating. If the first resin coating has not been removed and a second resin coating is formed over it, then both can be removed in the same operation.

In some cases, a radiation detector comprises multiple layers including layers of material in addition to a resin coating and scintillator layer. For example, additional layers can include an optically absorptive or reflective layer. An optically reflective or absorptive layer will typically include inorganic materials, such as metals and the like. In one embodiment, for example, a portion of the detector (e.g., substrate, resin layer, scintillator layer) can be coated with a reflective layer(s), such as inorganic material, $Al_2O_3$, aluminum, white paint, and the like, and/or a moisture protective barrier, such as for example silicon monoxide (SiO), silicon nitride ($Si_3N_4$), zirconium oxide (ZrO), silicon dioxide ($SiO_2$), and the like. Additional layers can also include additional resin layers and/or scintillator layers.

Figure 2:
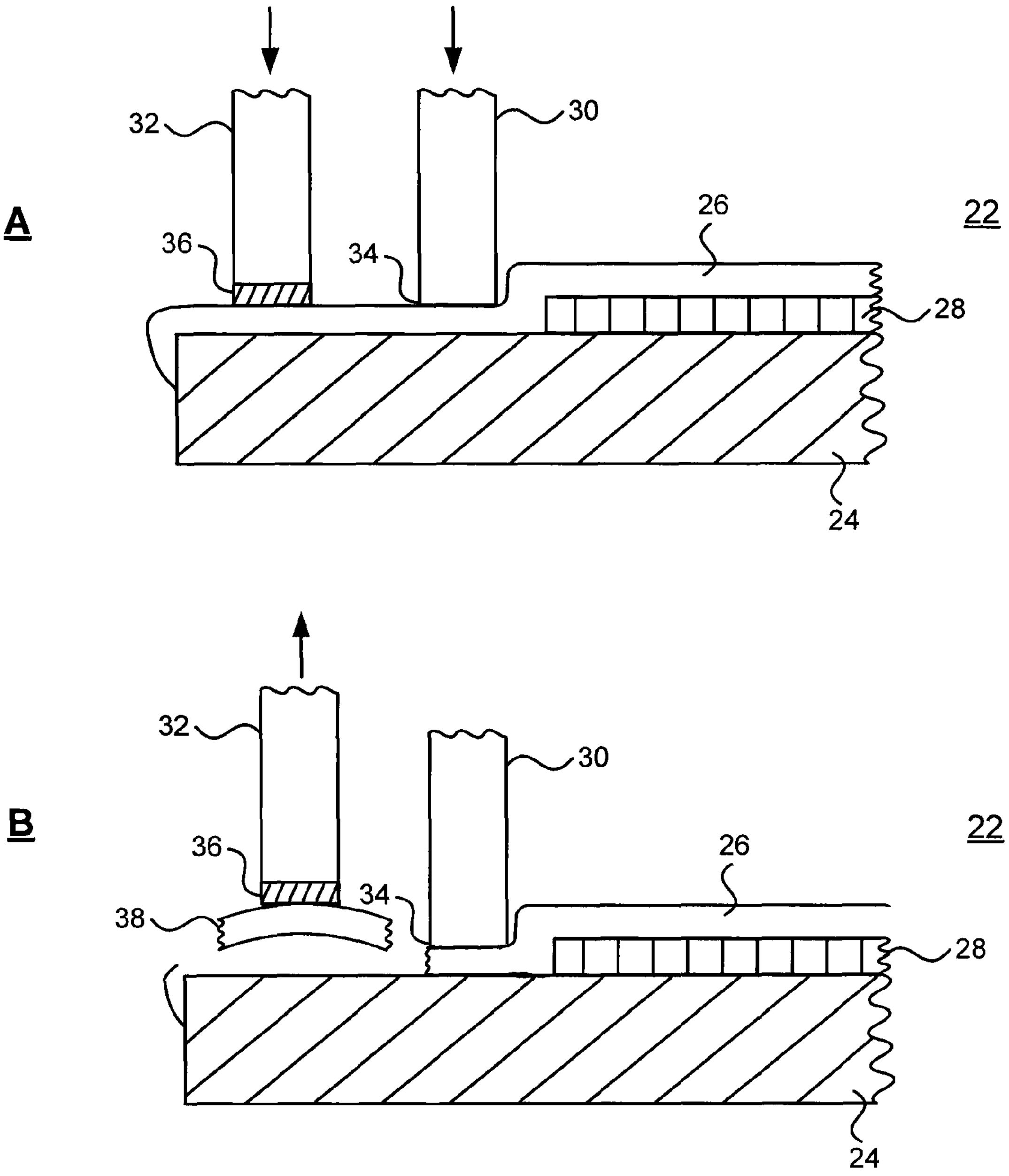
FIGS. 2A and 2B illustrate selective removal of a portion of a resin coating using an assembly according to an embodiment of the invention.

As shown in FIG. 2A, an assembly including a cutting member 30 and a bonding member 32 are positioned on the resin coating 26. A cutting member 30 is positioned on the radiation detector 22 such that the cutting edge 34 of the cutting member 30 is positioned at the approximate location on the resin coating 26 where cutting is desired. The bonding member 32, including a bonding surface 36, is positioned on the resin coating 26 and near the cutting member 30. The bonding surface 36 of the bonding member 32 attaches or adheres to the resin coating 26.

As can be appreciated, a bonding member is generally positioned near the cutting member, such that the desired selective removal of the resin coating can be accomplished. The exact positioning of the bonding member relative to the cutting member can depend, for example, on factors such as the size of the radiation detector and the area of the resin coating that is being removed. Positioning of the bonding member will be near the cutting member, e.g., generally about 0.0078 inches to about 0.04 inches, or about 0.2 mm to about 1.0 mm, and determined as including a distance that will practically allow a portion of the resin to be pulled away from the detector and subsequently detached, as described herein.

A bonding surface of an assembly of the invention can include any material that can attach or adhere to the resin coating and permit a portion of the coating to be pulled away from the detector so as to allow cutting and detachment. The bonding surface can include, for example, various bonding gums, resins, glues, adhesives, and the like. While the bonding functionality of the bonding member is described with respect to a surface, such term is used for the sake of convenience, and it will be understood that any bonding means that provides the desired functionality (e.g., permits pulling away resin coating from the detector) can be used, even those not strictly using a surface for bonding. For example, a bonding member can include a hollow portion where an applied negative pressure (e.g., vacuum) is used in order to accomplish the desired attachment. As such, the term "bonding surface" will include any suitable resin bonding means. Additional non-limiting examples include double sided adhesive tapes (e.g. Scotch™ double back tape), and fast-drying contact adhesives.

As shown in FIG. 2B, application of a force to the bonding member 32, such as lifting or pulling the bonding member 32 in a generally upward direction, will pull a portion of the resin coating away from the radiation detector 22. Once the portion of resin coating 26 is pulled away from the detector 22, the coating 26 is cut so as to detach the portion 38 of the resin coating from the radiation detector 22. As shown in FIG. 2B, in one embodiment, cutting of the resin coating 26 can be accomplished by pulling the resin coating 26 across the resin cutting edge 34. The cutting edge 34 is illustrated in FIG. 2B as having an approximately 90 degree angle, though numerous cutting edge embodiments may be used according to the present invention.

Figure 3:
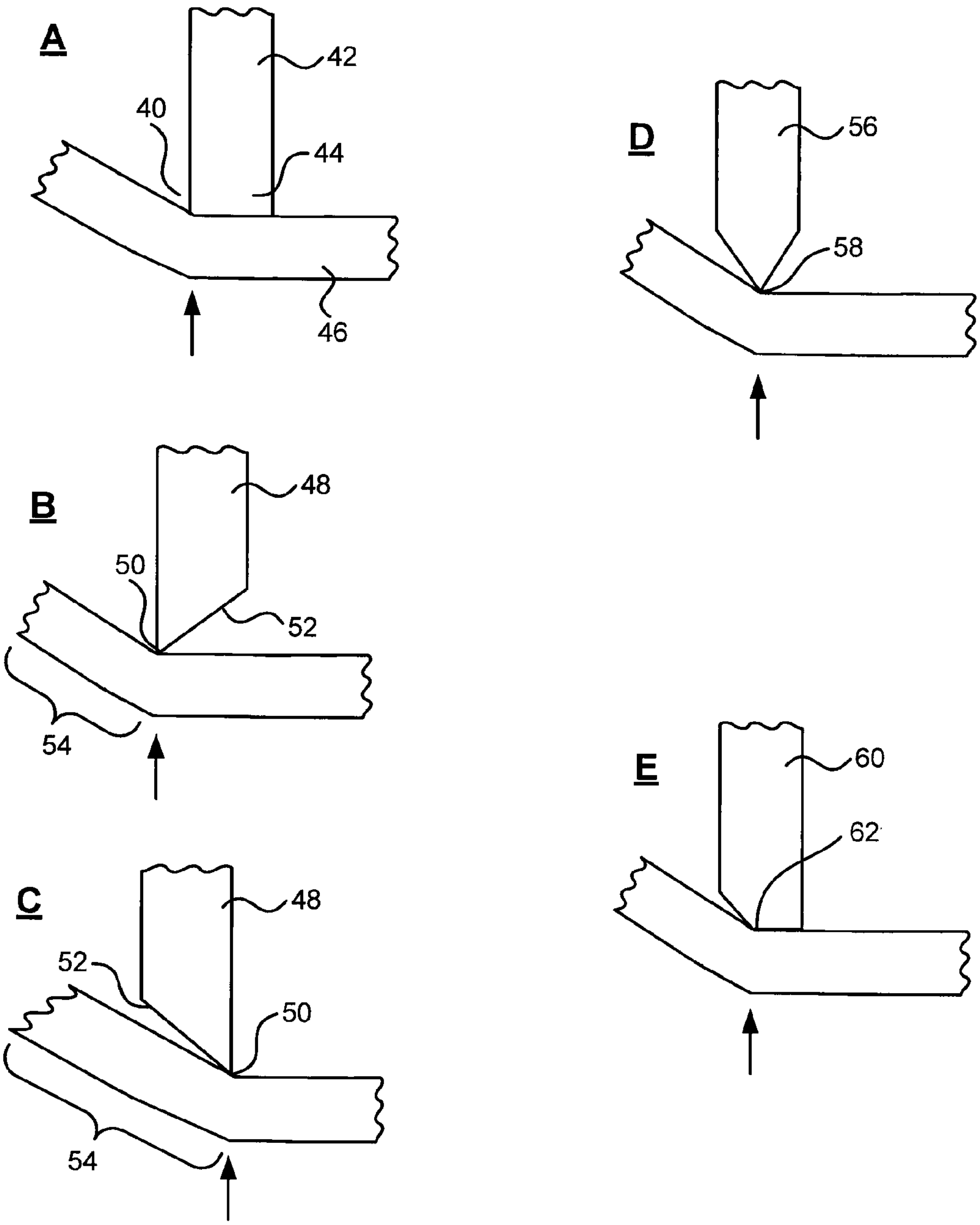
FIGS. 3A through 3B illustrates various cutting members according embodiments of the invention.

For example, several embodiments of a cutting edge of the cutting member according to the present invention are exemplified in FIGS. 3A through 3E. Approximate cutting planes corresponding to the various embodiments in FIGS. 3A through 3E are illustrated by arrows. In one embodiment, the cutting edge 40 of the cutting member 42 can be angled at about 90 degrees (FIG. 3A). This angle of the cutting edge 40 provides a distal surface 44 of the cutting member 42 that is substantially parallel to the resin coating 46. Such an angle and cutting surface may be desired in some instances because, for example, while the design reduces the cutting power of the cutting edge 40 as compared to "sharper" or more acutely angled cutting edge embodiments, the design can reduce the chance of the cutting member 42 too rapidly cutting through the resin 46 and damaging the surface of the radiation detector or components (e.g., electrical components, circuits, contacts, etc.) deposited thereon.

In another embodiment, the cutting edge can include an angle less than about 90 degrees (FIGS. 3B, 3C, 3D). The cutting power of a cutting member's cutting edge generally increases as the angle of the cutting edge decreases, so as to require less force applied between the resin coating and the cutting edge for cutting of the resin coating to take place. The orientation of the cutting member as positioned on the resin coating can vary and may at least partially depend, for example, on the contours of the radiation detector. For example, a cutting member 48 having an asymmetrical distal end and a cutting edge 50 angle less than about 90 degrees can be oriented with a distal surface 52 directed away from the portion 54 of resin coating being removed (FIG. 3B), or, alternatively, with the distal surface 52 directed toward the portion 54 of resin coating being removed (FIG. 3C). FIG. 3D illustrates another embodiment of a cutting member 56, the cutting member 56 having a substantially symmetrical distal end with a cutting edge 58 including an angle of less than about 90 degrees.

In another embodiment, a cutting member 60 can include a cutting edge 62 with an angle greater than about 90 degrees (FIG. 3E). For example, the distal end of a cutting member can be beveled or chamfered. Such an embodiment provides a reduced cutting power of the cutting edge compared to other illustrated embodiments.

Figure 4:
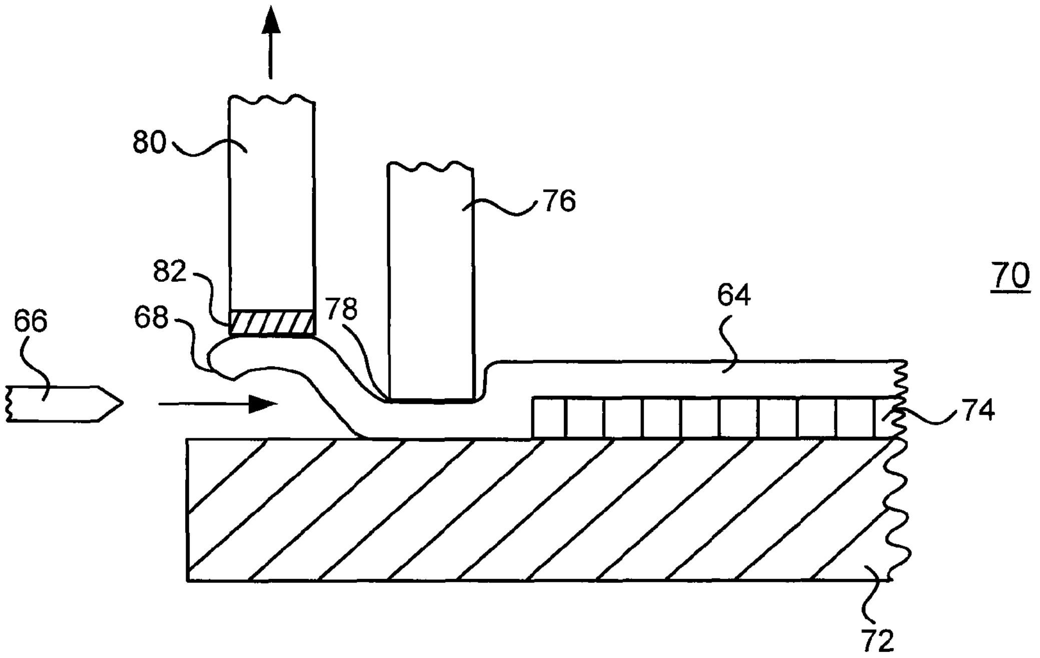
FIG. 4 is a diagrammatic view of selective removal of a resin coating according an embodiment of the invention.

Selective removal of a portion of a resin coating from a radiation detector, according to another embodiment of the invention, is described with reference to FIG. 4. As illustrated, cutting of the resin coating 64 is accomplished by applying a cutting tool 66 to the portion 68 of the resin coating pulled away from the radiation detector 70. The provided radiation detector 70 can include, for example, a substrate 72, a resin coating 64 and a scintillator layer 74, as illustrated in FIG. 4. In addition to the illustrated radiation detector, it will be recognized that additional embodiments of a radiation detector can be used (see above). A cutting member 76 having a cutting edge 78 is positioned on the resin coating 64, with the cutting edge 78 positioned at about the desired cutting location of resin coating 64. A bonding member 80 having a resin bonding surface 82 is positioned on the resin coating 64 near the cutting member 76. A portion 68 of the resin coating is pulled away from the radiation detector 70, for example, by application of a force (e.g., upward force) to the bonding member 80. The portion 68 of the resin coating pulled away from the detector 70 is detached by applying the cutting tool 66 to the portion 68. Typically, the cutting tool 66 is applied to the portion 68 of resin coating at a point between the location of the bonding member 80 and the cutting member 76, and can be applied from various directions in addition to that which is illustrated. For example, the cutting tool 76 can be applied to the resin coating portion 68 at about the location of the cutting edge 78 as positioned on the resin coating 64.

Numerous embodiments of cutting tools can be used according to the present invention, and will include any tool that can be used to detach the portion of the resin coating pulled away from the detector. In one embodiment, for example, the cutting tool can include a continuous sharpened edge, such as a razor, or can alternatively include a serrated or otherwise discontinuous cutting surface. Cutting can be accomplished, for example, by pressing or sliding the cutting tool on the resin coating. A cutting tool can include a actuating or moving cutting piece, such as a cutting wire, saw or cutting disk. Alternatively, the cutting tool can include a razor blade, precision cutting knife, hot knife cutter, and the like.

Figure 5:
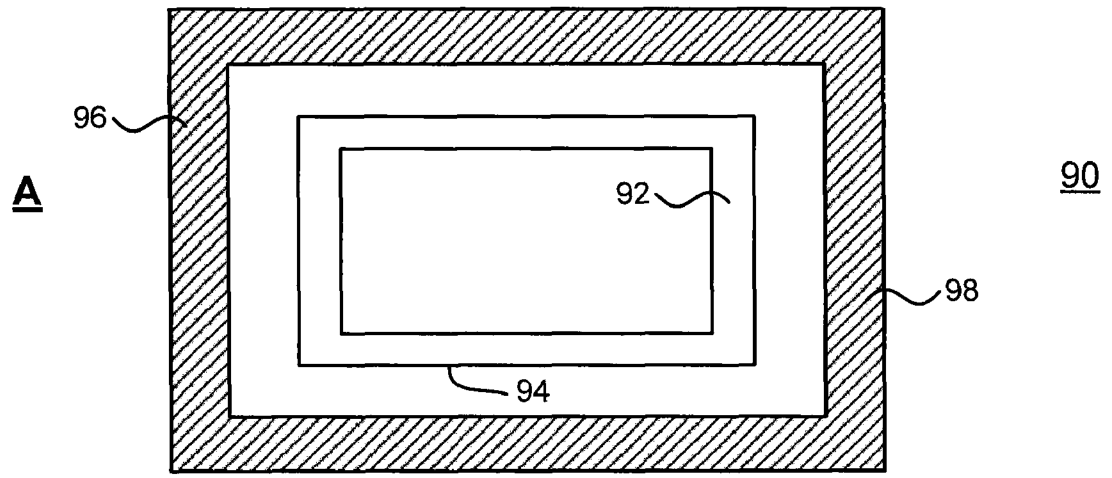
FIGS. 5A and 5B illustrate an embodiment of the assembly of the present invention.
Figure 5:
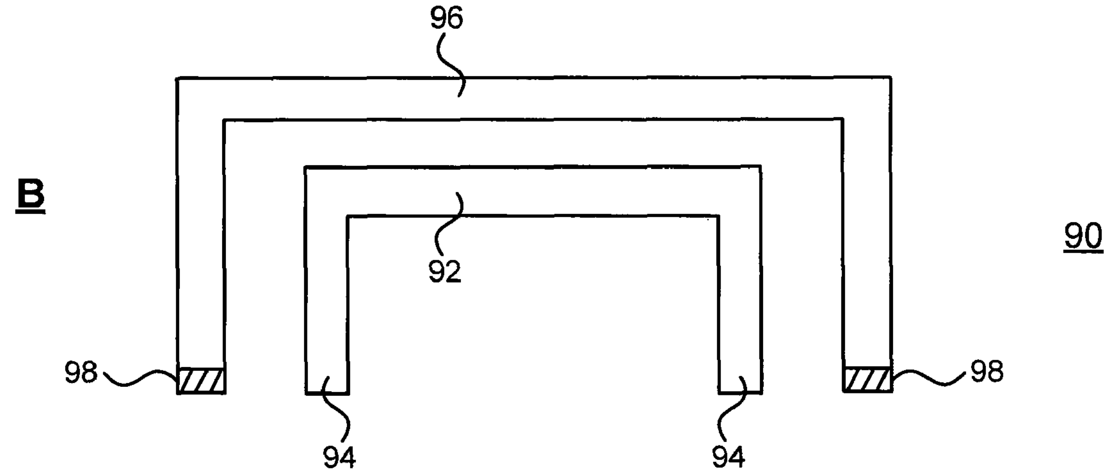

Another embodiment of an assembly of the present invention is described with reference to FIGS. 5A and 5B. FIG. 5A shows a sectional bottom-view of the assembly 90. FIG. 5B illustrates a sectional side-view of the assembly 90. The assembly 90 includes a first frame 92 that is substantially rigid and includes a cutting edge 94. The assembly 90 further includes a second frame 96 that is substantially rigid and includes a bonding surface 98. As can be appreciated from FIG. 5A, the first frame 92 cutting edge 94 will define a portion of the resin coating formed on a radiation detector. In particular, the cutting edge 94 corresponds to a portion of resin coating that will remain on the radiation detector following selective removal of other resin portions. The cutting edge 94 of the first frame can be continuous and/or extend along the entire periphery of the first frame, so that the first frame 92 essentially forms a cutting die with a continuous cutting surface. Alternatively, the cutting edge 94 may be discontinuous or the first frame 92 can include multiple cutting edges, wherein the sum length of the cutting surfaces of the edges are less than the length (e.g., circumference) of the periphery. While a generally rectangular shaped periphery is defined by the first frame 92 illustrated in FIGS. 5A and 5B, it will be appreciated that other embodiments can include periphery shape variations and may include, for example, a generally circular, oval, square, etc. configuration or shape configurations of more detailed structure.

Further, the second frame 96 is dimensioned such that the cutting edge 94 of the first frame 92 fits substantially within the periphery of the second frame 96. As such, when the assembly 90 is positioned on a radiation detector, the bonding surface 98 of the second frame 96 will contact a portion of the resin outside the portion defined by the cutting edge 94 of the first frame 92.

Figure 6:
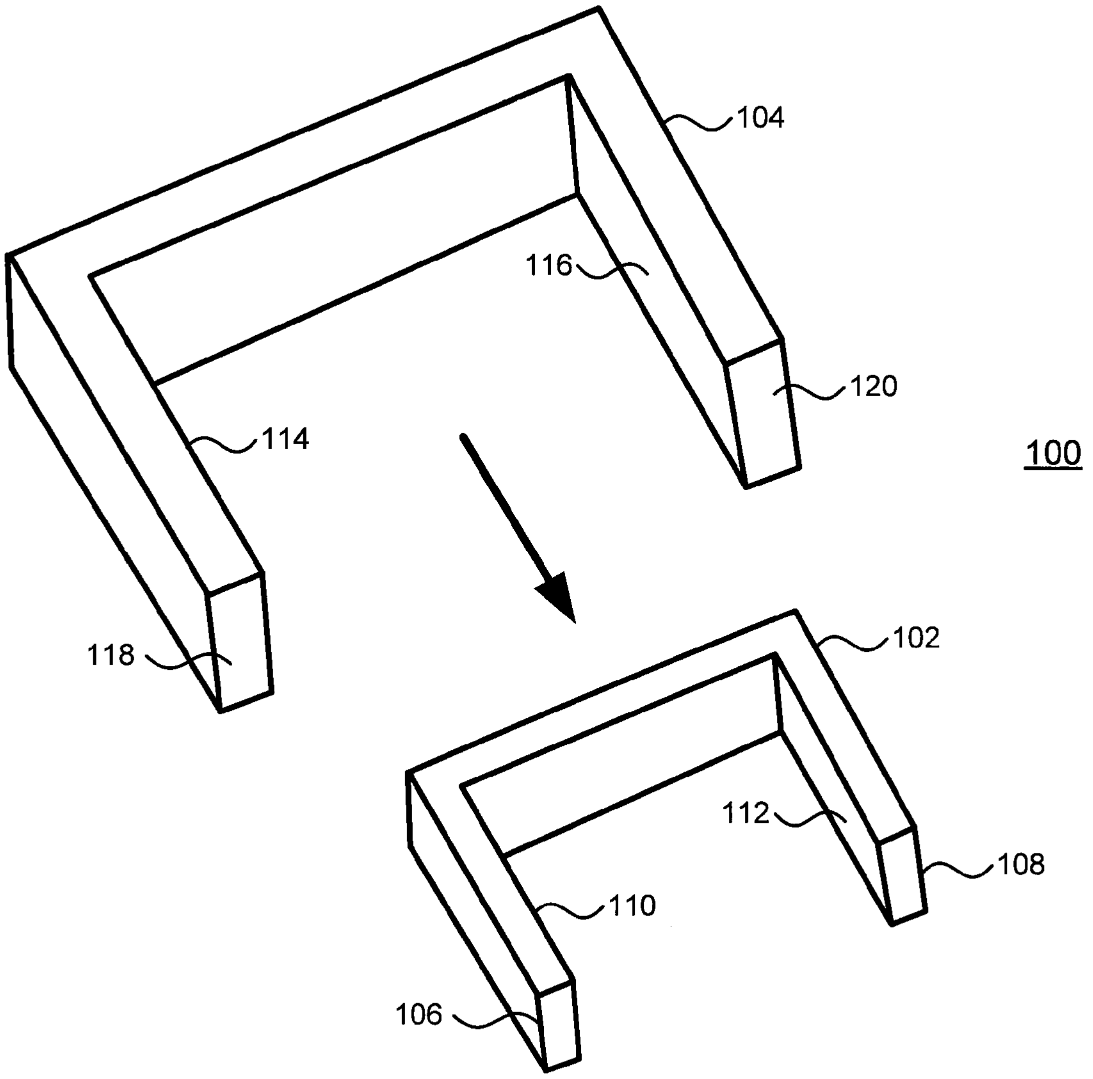
FIG. 6 is an isometric view of an assembly according to an embodiment of the invention.

Another embodiment of an invention assembly is described with reference to FIG. 6. The assembly 100 includes a first frame 102 and a second frame 104. While the first frame 102 defines a periphery, the cutting edges 106, 108 are present on less than the entire periphery. The first frame 102 includes opposing cutting members 110, 112, each having cutting edges 106, 108. Similarly, the second frame 104 includes opposing bonding members 114, 116 with each bonding member 114, 116 having a bonding surface 118, 120, respectively. The second frame 104 is generally larger with respect to at least the periphery and dimensioned such that the first frame 102 cutting edges 106, 108 fit substantially within the periphery of the second frame 104. In use, the assembly 100 can be applied, for example, to a radiation detector where the width of the resin coating is equal to or less than the width of the first frame cutting edges 106, 108. Thus, use of the assembly 100 allows selective removal of portions of the resin coating outside the periphery of the first frame and flanking the cutting edges 106, 108.

Figure 7:
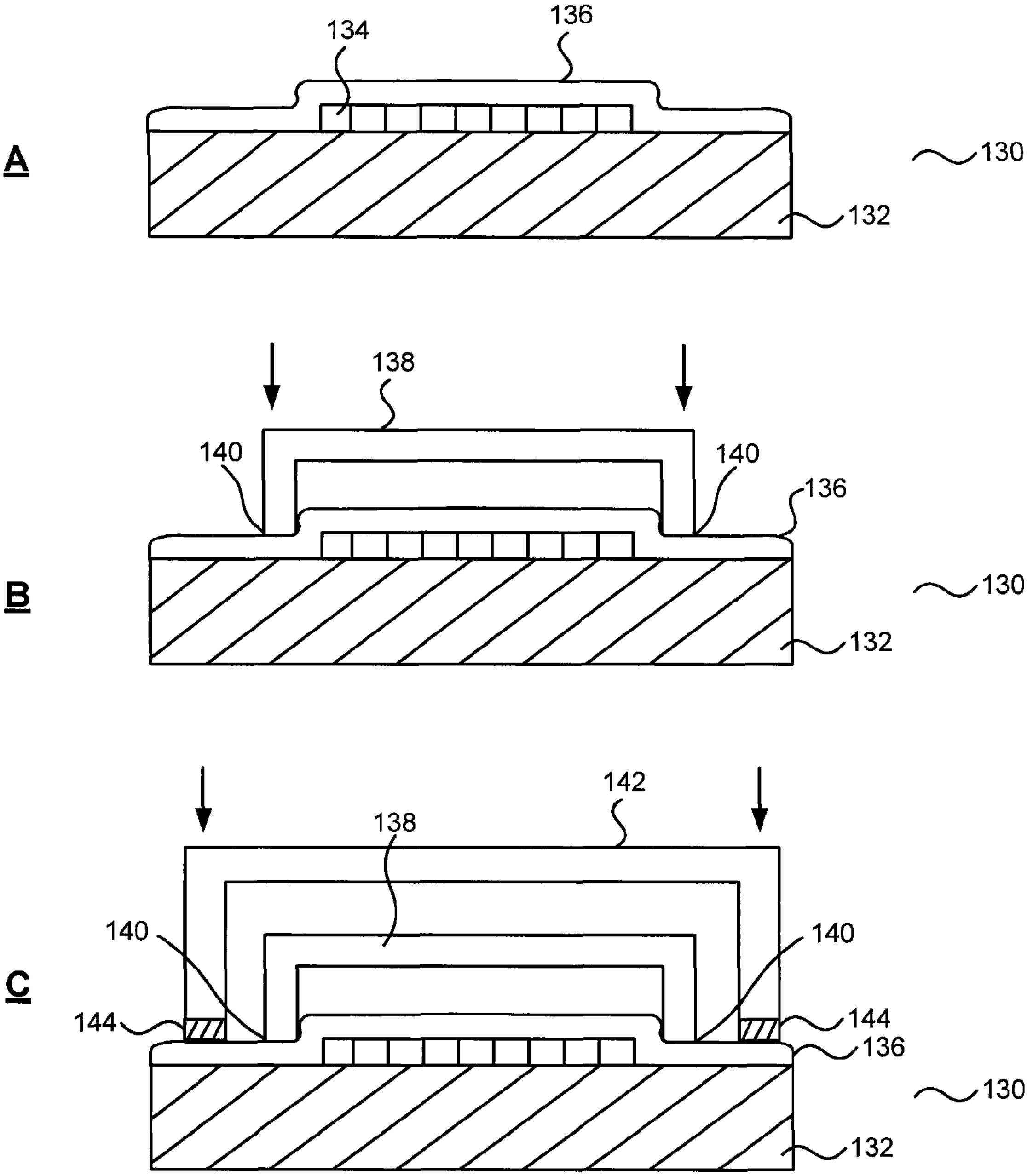
FIGS. 7A through 7F illustrate selective removal of a portion of a resin coating using an assembly according to another embodiment of the invention
Figure 7:
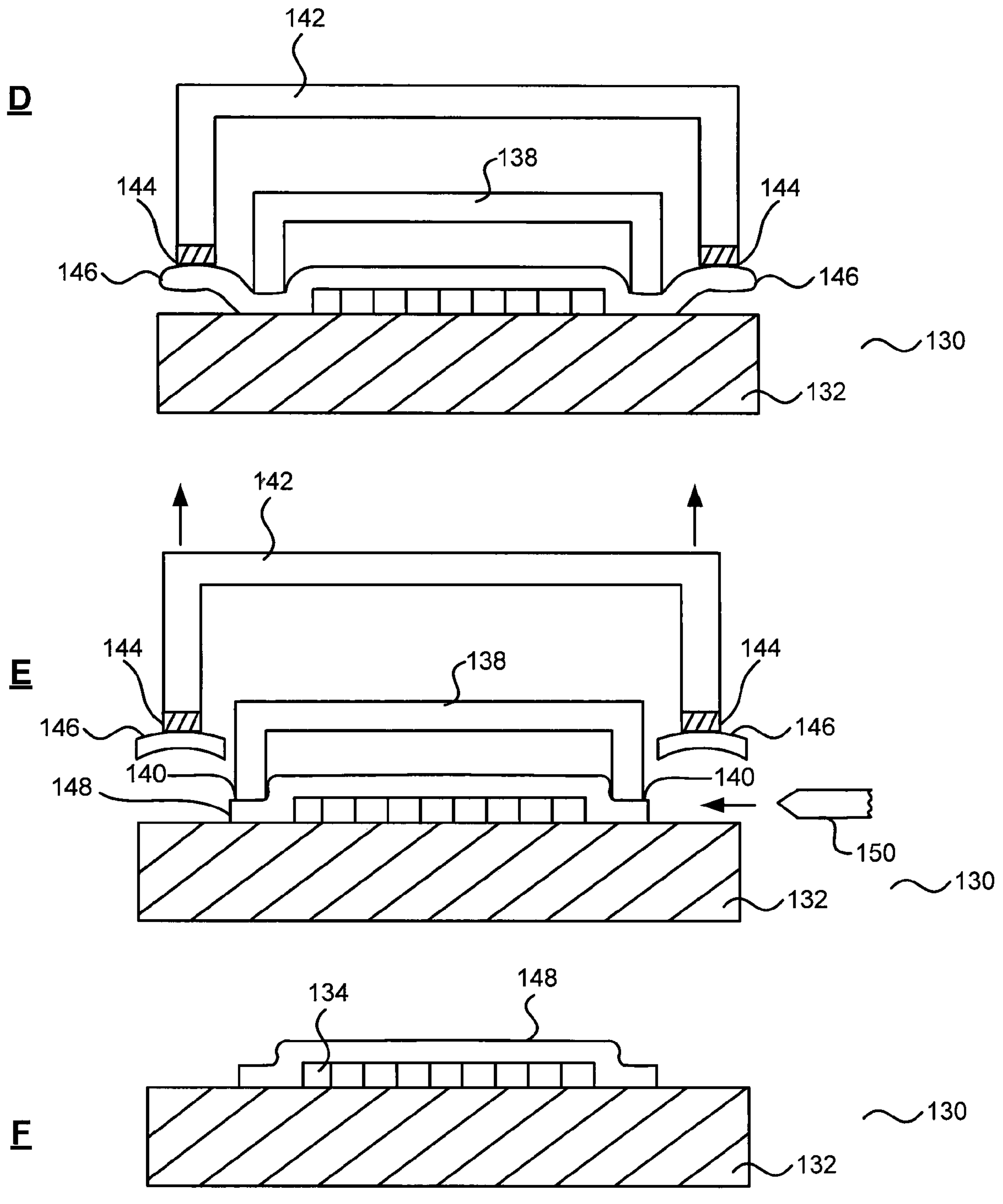

Selective removal of a portion of a resin coating using an assembly of the invention is described with reference to FIGS. 7A through 7F. A radiation detector 130 is provided, the radiation detector 130 including a substrate 132, a scintillator layer 134, and a resin coating 136 (FIG. 7A). In addition to the illustrated radiation detector 130, various other configurations of a radiation detector having a resin coating are suitable for use in the present invention (see above). A first frame 138 is then positioned on the resin coating 136 formed on the radiation detector 130 (FIG. 7B). The first frame 138 includes a resin cutting edge 140 or a plurality of cutting edges. The cutting edge 140 defines an area of the resin coating 136 corresponding to the portion of the coating 136 that will be left on the radiation detector 130 following selective removal. Resin coating 136 located outside the periphery or cutting edge 140 of the first frame 138 as positioned on the detector 130 will be removed. Once the first frame 138 is positioned, a second frame 142 is positioned on the resin coating 136 (FIG. 7C). The second frame 142 includes a resin bonding surface 144, or plurality thereof, that contact a portion of the resin coating 136 lying outside the periphery or cutting edge 140 of the first frame 138. Thus, the second frame 142 is dimensioned and positioned on the resin coating 136 such that the cutting edge 140 of the first frame 138 is fit substantially within the periphery of the second frame 142. Once the first frame 138 and second frame 142 are positioned on the resin coating 136, a force is applied to the second frame 142 such that a portion 146 of the resin coating is pulled away from the radiation detector 130 (FIG. 7D). The portion 146 of the resin coating pulled away from the detector 130 is then cut so as to detach the portion 146 of the resin coating pulled away from the detector 130 and leave a portion 148 of the resin coating on the radiation detector 130 (FIG. 7E). In one embodiment, the cutting of the resin coating is accomplished by pulling the resin coating against or across the resin cutting edge 140 of the first frame 138. Alternatively, a separate cutting tool 150 can optionally be applied to the resin coating to cut the coating and detach the portion 146 of resin coating pulled away from the detector 130 (see also, e.g., FIG. 4). Once the portion 146 of resin coating pulled away from the radiation detector 130 is cut and detached, the first frame 138 can be removed from the radiation detector 130. Selective removal of a portion 146 of resin coating thereby produces a radiation detector 130 having a substrate and a portion 148 of resin coating (FIG. 7F).

An assembly of the invention can further be coupled with additional devices and machinery. For example, aspects of the assembly can be coupled with a positioning or placement apparatus, or an apparatus for applying pressure or pressing a component (e.g., bonding member, cutting member, frame, etc.) of an inventive assembly against a resin coating of a radiation detector, and/or subsequently withdrawing the component from the radiation detector. A pressing device such as a screw press, levered press, hydraulic press, etc. can be coupled, for example, to a bonding member or frame and be used to bring the component into contact with the resin coating accomplish bonding to the coating. Such a device, or separate device, can be coupled with the bonding member or frame for applying a force to the bonding member or frame such that a portion of the resin coating is pulled away from the detector.

Additionally, in some instances, such as where the detector includes circuitry or other electrical components, a grounding means can be included, for example, to protect the detector from static discharge. A grounding means can be coupled with either the detector or the assembly, or both. Various grounding means are known and can include, for example, an electrical conduit, such as a wire or other conductive member (e.g., strap, surface, etc.). For instance, the detector assembly can rest on a conductive foam or conductive surface (e.g., Mylar™), both materials made by loading carbon black on a plastic.

Methods of selectively removing a resin portion, as described herein, can be accomplished manually by the user either in whole or in part, or assembly components can optionally be coupled with automated equipment (e.g., assembly machinery, robotics and the like). Any of a wide variety of commercially available or proprietary movement mechanisms or robotic motion stages may be used to support and move the structures described herein, with movement typically being effected using one or more electrical actuators, hydraulic actuators, pneumatic actuators, manual handles, or the like. The active movements may optionally be coordinated and/or controlled using any of a wide variety of proprietary or commercially available controllers such as proprietary computer control boxes having one or more processing structures, a personal computer, a notebook computer, a mainframe, or the like, with such automated systems often comprising data processing hardware and/or software configured to implement any one (or any combination of) the method steps described herein. Any software will typically comprise machine readable code of programming instructions embodied in a tangible media such as a memory, a digital or optical recording media, optical, electrical, or wireless telemetry signals, or the like, and one or more of these structures may also be used to transmit data and information between components of the system in any of a wide variety of distributed or centralized signal processing architectures.

It is understood that the examples and embodiments described herein are for illustrative purposes only and that various modifications or changes in light thereof will be suggested to persons skilled in the art and are to be included within the spirit and purview of this application and scope of the appended claims. Numerous different combinations are possible, and such combinations are considered to be part of the present invention.

What is claimed is:

1. A method of selectively removing a portion of a resin coating formed on a radiation detector, the resin coating comprising a proximal top surface and a distal bottom surface in contact with a substrate of the detector, the method comprising:

- positioning a resin cutting edge on the resin coating in a first position without the cutting edge advancing proximally through the distal bottom surface of the resin coating;
- positioning a bonding member on the resin coating;
- applying a force to the bonding member such that a portion of the resin coating is pulled away from the radiation detector;
- cutting the resin coating using the cutting edge so as to detach the portion of the resin coating pulled away from the detector, wherein the cutting edge is held substantially in the first position and the resin coating is pulled across the cutting edge in response to the force applied to the bonding member, thereby selectively removing the portion of the resin coating from the radiation detector.

2. The method of claim 1, wherein the resin cutting edge comprises an angle of about 90 degrees or less.

3. The method of claim 1, wherein the resin cutting edge comprises an angle greater than about 90 degrees.

4. The method of claim 1, wherein the cutting comprises pulling the resin coating across the resin cutting edge.

5. The method of claim 1, wherein the cutting comprises applying a cutting tool to the portion of the resin coating pulled away from the radiation detector.

6. The method of claim 1, wherein the resin coating comprises an organic polymer.

7. The method of claim 6, wherein the organic polymer is a para-xylylene polymer.

8. The method of claim 1, wherein the radiation detector comprises a substrate, a scintillator layer, and the resin coating.

9. The method of claim 8, wherein the scintillator layer comprises CsI(Tl).

10. The method of claim 8, wherein the resin coating is at least partially formed on the scintillator layer.

11. The method of claim 8, wherein the resin coating is at least partially disposed between the substrate and the scintillator.

12. A method of removing a portion of a resin coating formed on a radiation detector, comprising:

positioning in a first position on the resin coating a first substantially rigid frame having a resin cutting edge so as to define a first portion of the resin coating and without the cutting edge passing entirely through the resin coating;

positioning on the resin coating a second substantially rigid frame having a resin bonding surface, wherein the second frame is positioned such that the cutting edge of the first frame is fit substantially within a periphery of the second frame and the resin bonding surface contacts a second portion of the resin coating;

applying a force to the second frame such that the second portion of the resin coating is pulled away from the radiation detector;

cutting the resin coating using the cutting edge held substantially in the first position and the resin coating pulled across the cutting edge in response to the force applied to the second frame so as to detach the second portion of the resin coating and leave the first portion of the resin coating on the radiation detector.

13. The method of claim 12, wherein the first periphery comprises a single, continuous cutting edge.

14. The method of claim 12, wherein the first periphery comprises a plurality of cutting edges.

15. The method of claim 12, wherein the resin bonding surface comprises an adhesive.

16. The method of claim 12, wherein the second periphery comprises a plurality of bonding surfaces.

17. The method of claim 12, wherein the cutting comprises pulling the resin coating across the resin cutting edge.

18. The method of claim 12, wherein the cutting comprises applying a cutting tool to the portion of the resin coating pulled away from the radiation detector.

19. The method of claim 12, wherein the resin coating comprises an organic polymer.

20. The method of claim 19, wherein the organic polymer comprises para-xylylene.

* * * * *